United States Patent [19]

Hojo et al.

[11] Patent Number: 4,831,544
[45] Date of Patent: May 16, 1989

[54] ATTITUDE AND HEADING REFERENCE DETECTING APPARATUS

[75] Inventors: Takeshi Hojo; Kanshi Yamamoto; Mikio Morohoshi, all of Kuroiso; Fuyuki Hame, Tochigi, all of Japan

[73] Assignee: Tokyo Keiki Co., Ltd., Tokyo, Japan

[21] Appl. No.: 121,873

[22] Filed: Nov. 17, 1987

[30] Foreign Application Priority Data

Nov. 21, 1986 [JP] Japan .................. 61-277879
Dec. 15, 1986 [JP] Japan .................. 61-298085
Dec. 15, 1986 [JP] Japan .................. 61-298086

[51] Int. Cl.$^4$ ............ G06G 7/78; G06F 15/50; G01P 9/00
[52] U.S. Cl. ............... 364/453; 244/3.2; 244/3.21; 73/504
[58] Field of Search ........... 364/453, 434; 244/3.2, 244/3.21; 73/504, 505, 178 R

[56] References Cited

U.S. PATENT DOCUMENTS

3,442,140 5/1969 Pelteson ................. 73/504
4,212,443 7/1980 Duncan et al. .......... 73/504

Primary Examiner—Theodore M. Blum
Assistant Examiner—Gregory C. Issing
Attorney, Agent, or Firm—Hill, Van Santen, Steadman & Simpson

[57] ABSTRACT

An attitude and heading reference detecting apparatus having three gyros and three acceleometers mounted to a navigation vehicle in such a manner that their input axes are made coincident with principal three axial directions of the navigation object, respectively, a magnetic azimuth sensor, a signal transforming section supplied with the outputs from the three gyros, the outputs from the three accelerometers and the output from the magnetic azimuth sensor, a computing section supplied with the output from the signal transforming section and a signal output section supplied with the output from the computing section, for producing an attitude and heading reference signal and for delivering the same to the outside.

4 Claims, 8 Drawing Sheets

ATTITUDE AND HEADING REFERENCE DETECTING APPARATUS

BACKGROUND OF THE INVENTION

1. Field of the Invention

The present invention relates generally to attitude and heading reference detecting apparatus and, more particularly, is directed to an attitude and heading reference detecting apparatus having a gyro, an accelerometer and a magnetic azimuth sensor for use with navigation vehicles such as an aircraft, an automobile or the like.

2. Description of the Prior Art

In the art, an aircraft is provided with a DG (directional gyro) and a magnetic compass (or flux valve compass), each of which is used to indicate the azimuth of the aircraft, a VG (vertical gyro) for indicating the attitude and heading reference angle of the aircraft and a turning meter for indicating the turning angular velocity or speed and a bank angle around the vertical axis of the aircraft, whereby the flight sense of the pilot can be supplemented, thus making it possible to secure safety of navigation of aircraft under any flight conditions.

Initially, the conventional attitude and heading reference detecting apparatus will be described with reference to FIGS. 1 to 4.

Figure 1:
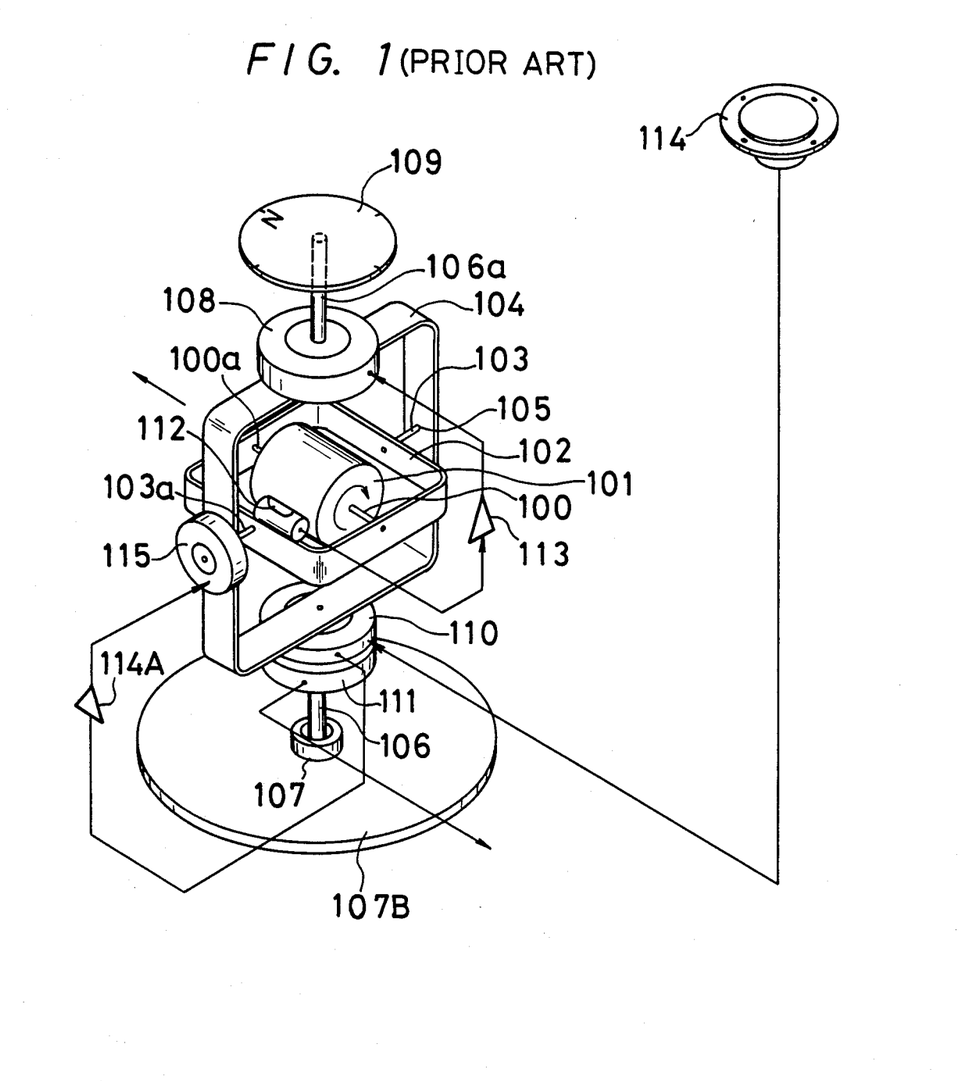
FIG. 1 is a perspective view illustrating an example of a conventional directional gyro.

FIG. 1 is a perspective view illustrating an example of a directional gyro used in the today's aircraft. As illustrated in FIG. 1, this conventional directional gyro comprises a gyro rotor 101 having spin shafts (axes) 100 and 100a arranged in the substantially horizontal direction which is rotated at high speed and a horizontal ring 102 which is a gyro case for supporting the gyro rotor 101 at its spin shafts 100 and 100a to be freely rotatable. The horizontal ring 102 has horizontal shafts (axes) 103 and 103a disposed at the positions perpendicular to the spin shafts 100 and 100a. These horizontal shafts 103 and 103a are rotatably engaged with horizontal shaft bearings 105 and 105a (horizontal shaft bearing 105a is not shown) fixed to a vertical ring 104 at the positions corresponding to the horizontal shafts 103 and 103a, respectively. The vertical ring 104 is provided with vertical shafts (axes) 106 and 106a extended in the up and down direction at the positions perpendicular to the horizontal shaft bearings 105 and 105a. These vertical shafts 106 and 106a are rotatably engaged with vertical shaft bearings 107 and 107a (vertical shaft bearing 107a is not shown) fixed to a base plate 107B that is fixed to the aircraft at the positions corresponding to the vertical shafts 106 and 106a. To the upper vertical shaft 106a, there are mounted an erecting torquer 108 and a compass card 109, while a synchro receiver 110 and a synchro transmitter 111 are mounted to the lower vertical shaft 106.

The horizontal ring 102 is provided with an electrolytic level 112 which detects the inclination of the spin shafts 100 and 100a relative to the horizontal plane. The output from the electrolytic level 112 is fed through an amplifier 113 back to the erecting torquer 108, thus always maintaining the spin shafts 100 and 100a of the gyro rotor 101 in the horizontal plane. This loop is referred to as an erection loop. A flux valve 114 is adapted to magnetically detect the azimuth angle of the body of the aircraft and produces the magnetic azimuth output. This magnetic azimuth output therefrom is supplied to the synchro receiver 110 which produces a deviation signal between the magnetic azimuth output and the azimuth of the spin shafts 100 and 100a, that is, the gyro azimuth. This deviation signal is fed through an amplifier 114A back to a slaving torquer 115 provided at the horizontal shaft 103a, thus causing the gyro azimuth to coincide with the magnetic azimuth. This loop is referred to as an azimuth slaving loop. Under severe movement of the aircraft, the gyro azimuth is generated and an azimuth angle error caused by the gyro drift is restricted or slaved to the magnetic azimuth derived from the flux valve 114, thus maintaining the accuracy of the azimuth of the aircraft's body. The azimuth of the aircraft's body is read through the compass card 109 mounted to the vertical shaft 106a.

Figure 2:
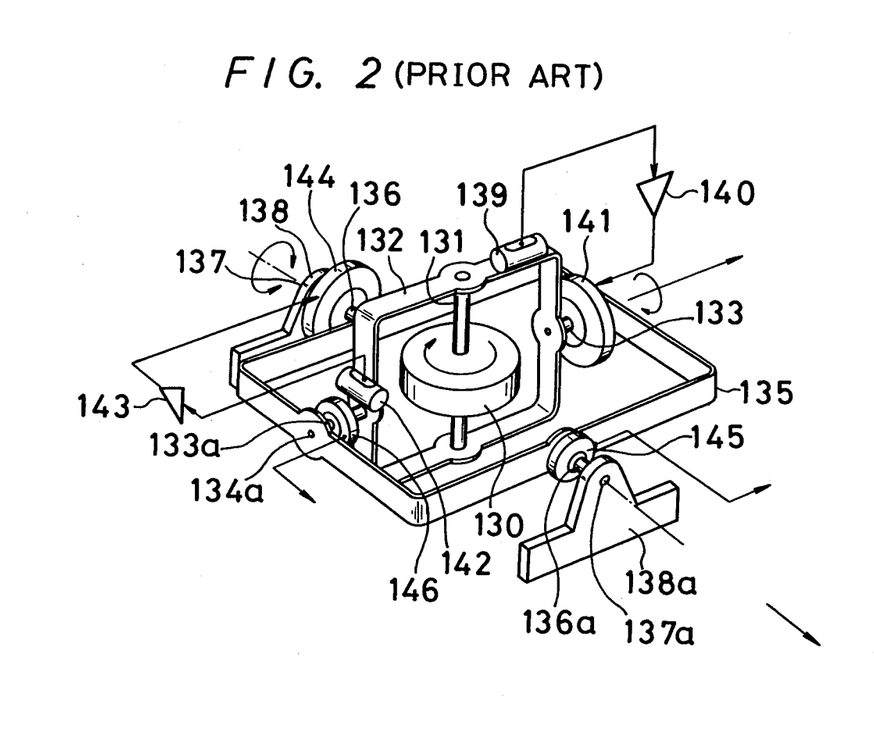
FIG. 2 is a perspective view illustrating an example of a conventional vertical gyro.

FIG. 2 illustrates an example of a conventional gyroscopic horizon (vertical gyro) for detecting an inclination angle (an angle of roll and an angle of pitch) of the body of an aircraft. In this example, an inner gimbal 132 includes therein a gyro rotor 130 having a spin shaft 131 in the substantially vertical direction and which is rotated at high speed. The inner gimbal 132 is provided at its horizontal positions perpendicular to the spin shaft 131 with pitch shafts 133 and 133a. These pitch shafts 133 and 133a are rotatably engaged with pitch shaft bearings 134 and 134a (pitch shaft bearing 134 is not shown) fixed to an outer gimbal 135 at the positions corresponding to the pitch shafts 134 and 134a. The outer gimbal 135 is provided at its positions perpendicular to the above-mentioned pitch shafts 133 and 133a with roll shafts 136 and 136a. These roll shafts 136 and 136a are rotatably engaged with roll shaft bearings 137 and 137a fixed to roll base tables 138 and 138a attached to the body of aircraft in the direction from its nose to the tail. The inner gimbal 132 includes a roll electrolytic level 139 for detecting the inclination of the spin shaft 131 relative to the horizontal plane around the roll shafts 136 and 136a and a pitch electrolytic level 142 for detecting the inclination of the spin shaft 131 around the pitch shafts 133 and 133a.

The output from the roll electrolytic level 139 is fed through a roll amplifier 140 back to a roll torquer 141 attached to the pitch shaft 133 so as to make the output from the roll electrolytic level 139 zero. This loop is referred to as a roll erecting system. On the other hand, the output from the pitch electrolytic level 142 is fed through a pitch amplifier 143 back to a pitch torquer 144 attached to the roll shaft 136, thus maintaining the inclination of the spin shaft 131 around the pitch shafts 133 and 133a to be zero. This loop is referred to as a pitch erecting system. The roll angle of the body of the aircraft is delivered from a roll angle transmitter 145 mounted to the roll shaft 136a, while the pitch angle is delivered from a pitch angle transmitter 146 mounted to the pitch shaft 133a.

Figure 3:
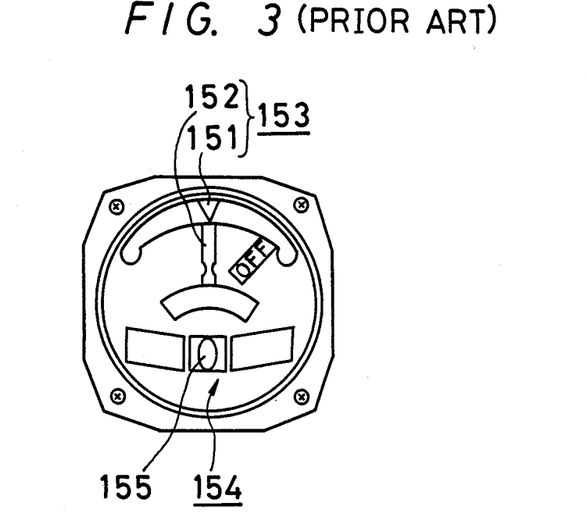
FIG. 3 is a front view of an indication section of a conventional turning meter.

FIG. 3 illustrates an indication section of a conventional turning meter of the aircraft. A lubber line 151 and a needle 152 of a turning angle speed indication portion 153 are used to indicate the turning speed of the aircraft measured by a gyro shown in FIG. 4. The lower half of the indication section is used as a bank angle indication section 154 which indicates a bank angle on the basis of the position of a ball 155 sealed into an annular portion having a curvature.

Figure 4:
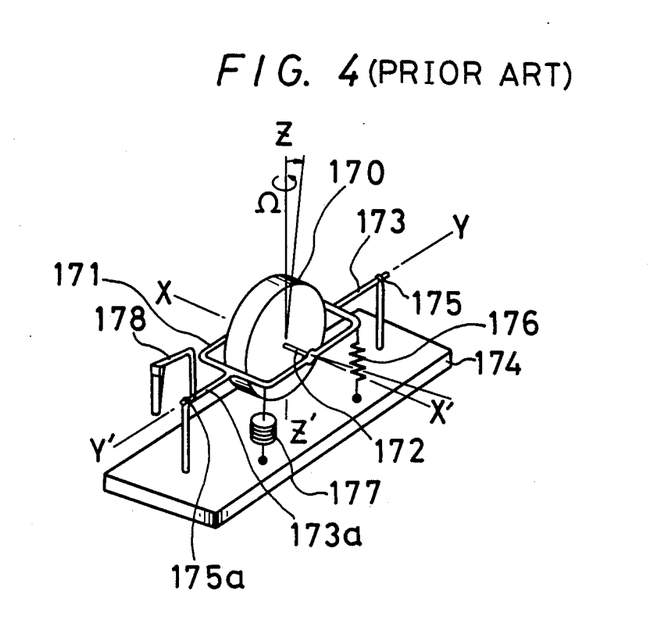
FIG. 4 is a perspective view of a rate gyro forming the conventional turning meter.

FIG. 4 illustrates a rate gyro which constructs the above-mentioned turning meter for detecting the turning angle speed of the body of the aircraft. Referring to FIG. 4, a gyro case 171 housing therein a gyro rotor 170 is provided at its positions perpendicular to the axis XX' of a spin shaft 172 of the gyro rotor 177 with output shafts 173 and 173a. These output shafts 173 and 173a are rotatably engaged with output shaft bearings 175 and 175a fixed to a base table 174 which is fixed to the body of the aircraft. A restoring spring 176 and a damping pot 177 are provided between the gyro case 171 and the base table 174.

If a turning angular speed $\Omega$ is applied around an input axis ZZ' perpendicular to both an output axis YY' and the axis XX' of the spin shaft 172, the gyro action causes a torque proportional to the turning angular speed $\Omega$ to be produced around the output axis YY'. This torque causes the gyro case 171 with its association elements to be rotated around the output axis YY' so that the restoring spring 176 produces a torque in response to the displacement angle of the gyro case 171, thus producing a balanced state. In other words, the input angular speed $\Omega$ is transformed into a rotation angle around the output axis YY' and this displacement angle is indicated by a needle 178 (corresponding to the needle 152 shown in FIG. 3) attached to the output shaft 173a.

The conventional apparatus as mentioned above, however, is complicated in mechanism, takes a lot of time and skill for its assembly and adjustment and is also high in cost. Further, since this conventional apparatus requires parts to be abraded such as a ball bearing, sliding electrical contacts and so on, this apparatus must undergo the routine maintenance and inspection and is also affected easily by vibration and shock.

Figure 5:
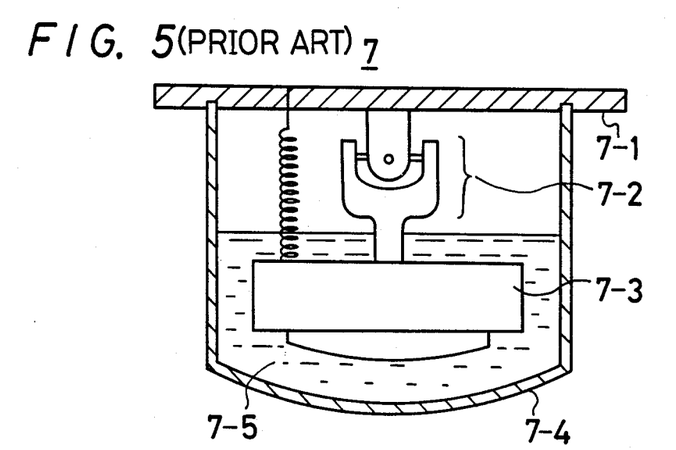
FIG. 5 is a paritally cross-sectional view of a conventional magnetic azimuth sensor.

FIG. 5 is a partially cross-sectional view illustrating an example of a magnetic azimuth sensor 7 which is what might be called flux valve compass. In this example, a magnetic azimuth detecting section 7-3 is suspended from the center of a base table 7-1 through a universal joint 7-2 just like a pendulum. A bowl portion 7-4 is attached to the lower surface of the base table 7-1 to form a case or container which houses therein the magnetic azimuth detecting section 7-3. This case is filled with damping oil 7-5, whereby pendulum movement of the magnetic azimuth detecting section 7-3 is attenuated. In spite of the inclination of the navigation vehicle, the universal joint 7-2 acts to always maintain the magnetic azimuth detecting section 7-3 in the horizontal plane, thus preventing the azimuth error from being caused by the inclination of the navigation vehicle.

Figure 6:
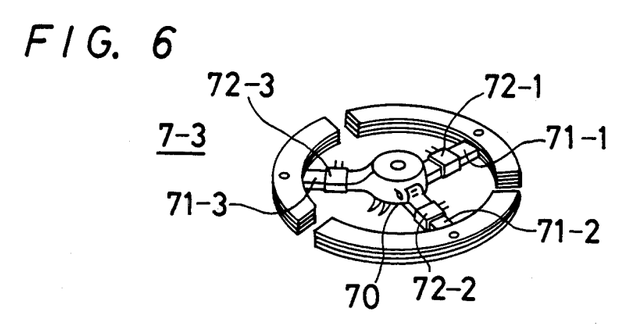
FIG. 6 is a perspective view illustrating a magnetic azimuth detecting section of the magnetic azimuth sensor shown in FIG. 5.

FIG. 6 is a perspective view of the magnetic azimuth detecting section 7-3 shown in FIG. 5. As shown in FIG. 6, this magnetic azimuth detecting section 7-3 is provided at its central portion with an exciter coil 70 which is formed of windings to be excited by an A.C. voltage source (not shown). Three pick-up coils 72-1, 72-2 and 72-3 are formed by windings wound around three spokes 71-1, 71-2 and 71-3 made of material having high magnetic permeability and fixed to the exciter coil 70 with an equal angular distance between adjacent ones and produce A.C. voltages corresponding to the azimuth of the navigation vehicle with a phase of 120°.

However, since this conventional magnetic azimuth sensor 7 has the magnetic azimuth detecting section 7-3 supported by the universal point 7-2 and requires the damping oil 7-5 for damping the magnetic azimuth detecting section 7-3 as mentioned above, it becomes large in size, heavy in weight and is also made high in cost.

OBJECTS AND SUMMARY OF THE INVENTION

Accordingly, it is a general object of the present invention to provide an improved attitude and heading reference detecting apparatus.

It is an object of the present invention to provide an attitude and heading reference detecting apparatus which can be simplified in construction and produced at low cost.

It is another object of the present invention to provide an attitude and heading reference detecting apparatus the lifetime of which is considerably long and which is substantially free from the routine maintenance and inspection.

It is still another object of the present invention to provide an attitude and heading reference detecting apparatus which can be assembled with ease.

It is a further object of the present invention to provide an attitude and heading reference detecting apparatus which can secure satisfactory system efficiency even when it employs inexpensive vibration gyro or gas gyro.

It is a further object of the present invention to provide an attitude and heading reference detecting apparatus which can reduce the estimate time of gyro bias.

It is still further object of the present invention to provide an attitude and heading reference detecting apparatus which can remove influence by the acceleration movement of a navigation vehicle.

It is still further object of the present invention to provide an attitude and heading reference detecting apparatus which can obviate influence of high frequency acceleration such as vibration and others.

It is yet further object of the present invention to provide an attitude and heading reference detecting apparatus which uses a magnetic azimuth sensor having no universal joint so that the apparatus of the invention can be made small in size, light in weight and can be produced at low cost.

According to one aspect of the present invention, there is provided an attitude and heading reference detecting apparatus comprising:

(a) three gyros and three acceleometers mounted to a navigation vehicle in such a manner that their input axes are made coincident with principal three axial directions of said navigation vehicle, respectively;

(b) a magnetic azimuth sensor;

(c) a signal transforming section supplied with outputs from said three gyros, outputs from said three accelerometers and an output from said magnetic azimuth sensor;

(d) a computing section supplied with an output from said signal transforming section; and (e) a signal output section supplied with an output from said computing section, for producing an attitude and heading reference signal and for delivering the same to an outside.

These and other objects, features and advantages of the present invention will become apparent from the following detailed description of the preferred embodiments to be taken in conjunction with the accompanying drawings, throughout which like reference numerals identify like elements and parts.

DESCRIPTION OF THE PREFERRED EMBODIMENTS

The present invention will now be described in detail with reference to the drawings.

An embodiment of the attitude and heading reference detecting apparatus according to the present invention will be described hereinafter with reference initially to FIGS. 7 and 8.

Figure 7:
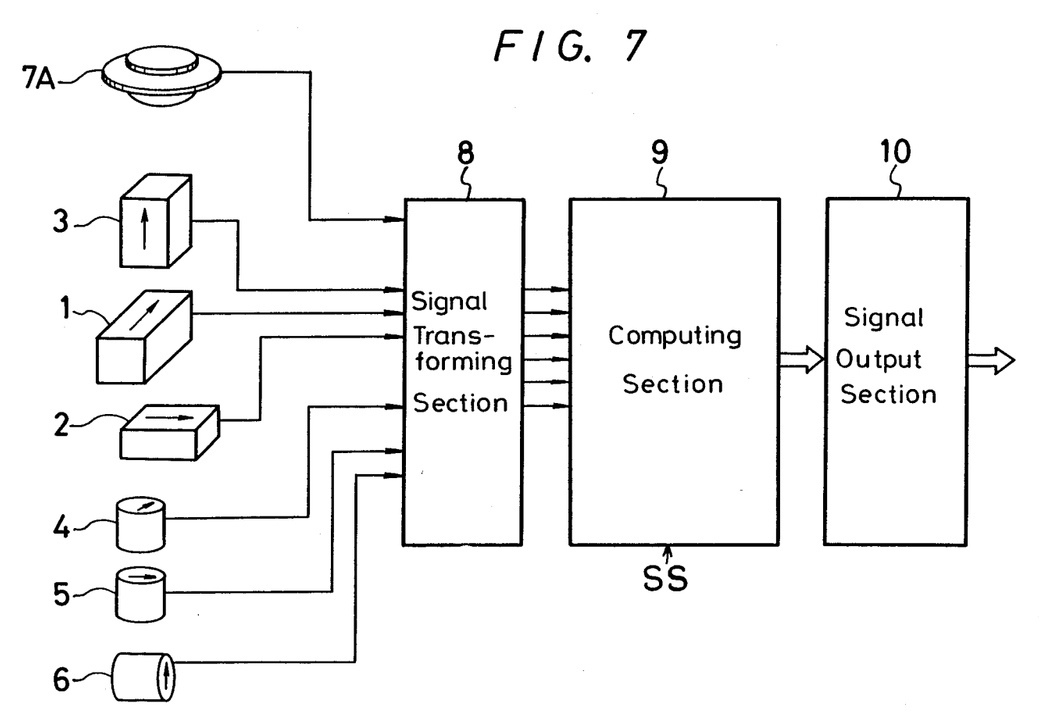
FIG. 7 is a block diagram showing an embodiment of an attitude and heading reference detecting apparatus according to the present invention.

FIG. 7 is a block diagram showing the overall arrangement of the embodiment of the attitude and heading reference detecting apparatus according to the present invention.

In the embodiment shown in FIG. 7, an X gyro 1, a Y gyro 2, a Z gyro 3, each being formed of non-rotational type gyro such as a vibration gyro, a gas rate gyro or the like, an X accelerometer 4, a y accelerometer 5, a Z accelerometer 6 and a magnetic azimuth sensor 7A are respectively attached to a navigation vehicle (not shown) in such a manner that their input axes are made coincident with principal three orthogonal axes, that is, X, Y and Z axes (see arrows in FIG. 7), respectively. The output signals (analog signals) from these elements 1 to 6 and 7A are supplied to a signal transforming section 8 in which they are transformed to digital signals and the digital signals therefrom are supplied to a computing section 9. In the computing section 9, the computation of coordinate transform matrix (CTM), gyro drift correcting computation, acceleration correction computation and so on are carried out and then signals such as a roll angle, a pitch angle, an azimuth angle, X, Y and Z angular speeds, a bank angle, a slip angle and so on necessary for controlling and navigating the navigation vehicle are delivered through a signal output section 10 to the outside.

Figure 8:
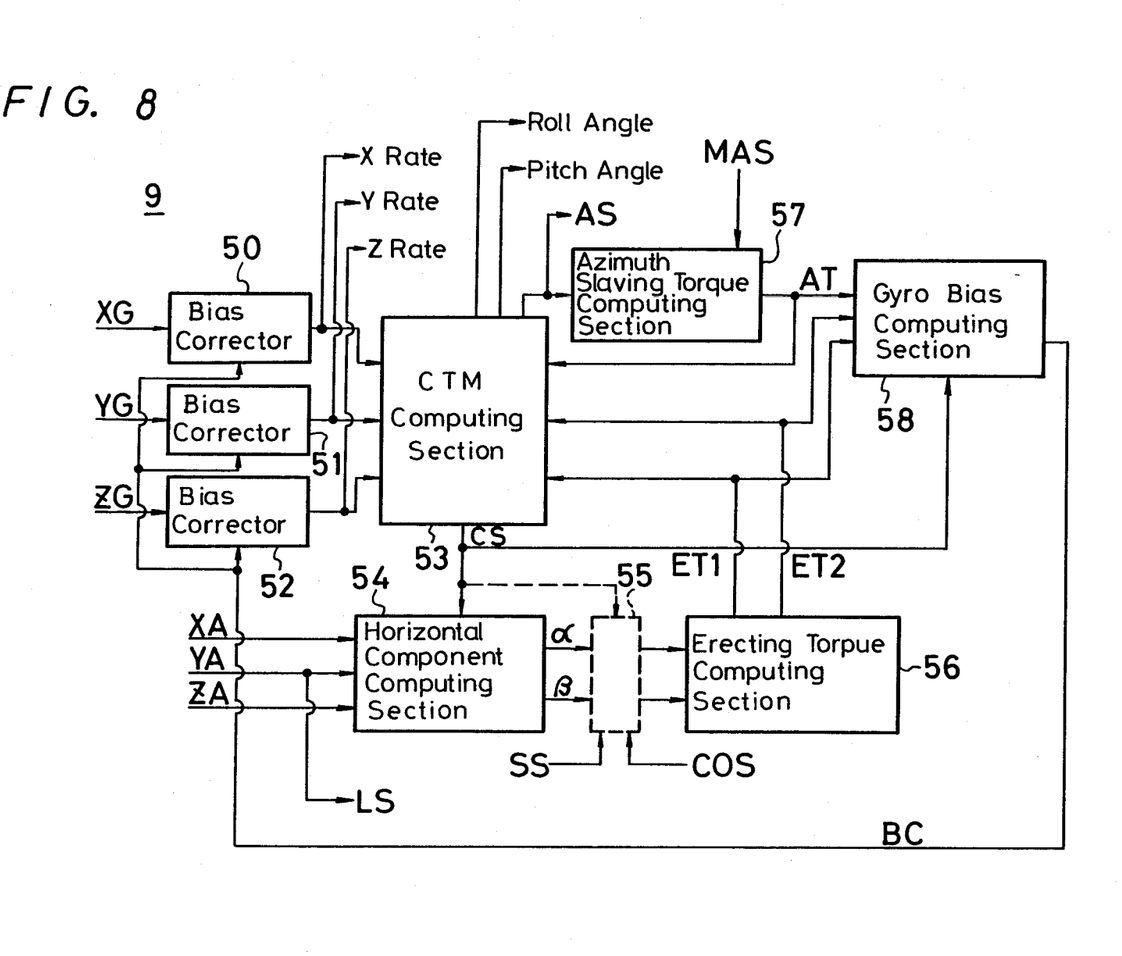
FIG. 8 is a block diagram showing an example of a computing section used in the embodiment of the attitude and heading reference detecting apparatus according to the invention shown in FIG. 7.

FIG. 8 is a block diagram showing an example of the computing section 9 shown in FIG. 7.

Referring to FIG. 8, gyro signals XG, YG and ZG from the X, Y and Z gyros 1, 2 and 3 are passed through the signal transforming section 8 shown in FIG. 7 and are supplied respectively through bias correctors 50, 51 and 52 to the signal output section 10 shown in FIG. 7 as X rate, Y rate and Z rate and are also supplied to a CTM (coordinate transform matrix) computing section 53 in which the CTM is calculated.

While, acceleration signals XA, YA and ZA produced from the X, Y and Z accelerometers 4, 5 and 6 are passed through the signal transforming section 8 (shown in FIG. 7) and are supplied to a horizontal component computing section 54 together with a CTM signal CS from the CTM computing section 53, in which horizontal components $\alpha$ and $\beta$ of the accelerations in both the east and west direction and south and north direction are computed. The thus computed horizontal components $\alpha$ and $\beta$ are supplied to an acceleration correcting and computing section 55 together with a speed signal SS derived from the velocity meter (not shown) on the body of the vehicle such as an aircraft and passed through the signal transforming section 8. In the acceleration correcting and computing section 55, the acceleration component of the movement of the vehicle is removed from these horizontal components $\alpha$ and $\beta$ and then fed to an erecting torque computing section 56, in which the erecting torque is computed. The computed result is then fed to the CTM computing section 53, in which torque is applied to the CTM so as to make the horizontal components $\alpha$ and $\beta$ zero.

The azimuth angle signal AS from the CTM computing section 53 and the magnetic azimuth signal MAS from the signal transforming section 8 are supplied to an azimuth slaving torque computing section 57 which compares and computes the two signals to thereby produce a slaving torque signal. The output torque signal AT therefrom is fed back to the CTM computing section 53, whereby torque is applied to the CTM, mainly around the azimuth axis, thus the CTM azimuth being restricted to the magnetic azimuth.

The output from the azimuth slaving torque computing section section 57 and the output from the erecting torque computing 56 are supplied to a gyro bias computing section 58 together with the CTM signal CS derived from the CTM computing section 53, wherein bias correcting signals for the X, Y and Z gyros 1, 2 and 3 are computed. Then, the output therefrom, or the bias correcting signal BC is supplied to the bias correctors 50, 51 and 52.

If the speed signal SS of desired accuracy is not obtained, the magnetic azimuth signal MAS or a cut-off signal COS provided from the X, Y and Z acceleration signals XA, YA and ZA or the like is supplied to the acceleration correcting and computing section 55, whereby when acceleration occurs, the supply of the input to the erecting torque computing section 56 may be cut off.

The output signals XG, YG and ZG from the three X, Y and Z gyros 1, 2 and 3 whose input axes are made coincident with the main three axial directions of the navigation vehicle are supplied through the bias correctors 50, 51 and 52 to the CTM computing section 53 which computes the CTM. The outputs XA, YA and ZA from the three X, Y and Z accelerators 4, 5 and 6 with their input axes arranged in parallel to the input axes of the above-mentioned X, Y and Z gyros 1, 2 and 3 and the CTM signal CS from the CTM computing section 53 are all supplied to the horizontal component computing section 54, in which the horizontal components $\alpha$ and $\beta$ of the acceleration of gravity are computed. If the CTM is correct, the horizontal components $\alpha$ and $\beta$ are zero. While, if an error exists in the CTM, the horizontal components $\alpha$ and $\beta$ take finite values so that they are transformed into the torquing signal so as to make the CTM correct with the errecting torque computing section 56. This torque signal is then supplied to the CTM computing section 53, whereby the CTM is rotated so to be oriented in the correct direction.

The azimuth angle signal AS from the CTM computing section 53 and the magnetic azimuth signal MAS from the magnetic sensor 7 are supplied to the azimuth slaving torque computing section 57, in which they are compared and computed to produce a torquing signal around the azimuth axis. This torquing signal is fed back to the CTM computing section 53 so as to remove the difference between the azimuth angular signal AS and the magnetic azimuth signal MAS.

If there exists, on the other hand, gyro drift, the outputs from the erecting torque computing section 56 and the azimuth slaving torque computing section 57 do not become zero but become finite values corresponding to the gyro drift. These signals are supplied to the gyro bias computing section 58 together with the CTM signal CS and the thus computed bias correcting signal BC is supplied to the bias correctors 50, 51 and 52 for the respective gyros 1, 2 and 3, to thereby correct the gyro drifts to zero.

The CTM computing section 53 produces the roll angle, the pitch angle and the azimuth angle of the navigation vehicle, the bias correctors 50, 51 and 52 produce angular speeds of the navigation vehicle or X rate, Y rate and Z rate and the Y accelerometer 5 produces a slip signal LS.

When the navigation vehicle moves with an acceleration such as during turning, increasing or decreasing its speed or the like, the supply of the input to the errecting torque computing section 56 is cut off and the influence of acceleration is obviated. When the speed signal SS is obtained from another sensor which is not shown, this speed signal SS and the CTM signal CS are supplied to the acceleration correcting and computing section 55 which removes the influence of the acceleration.

The arrangement of the gyro bias computing section 58 in the embodiment shown in FIG. 8 will be described more fully with reference to FIG. 9. According to the present invention, since the gyro bias is computed by utilizing a so-called observer in the control engineering, this observer will be described first.

The linear control system is generally expressed by a differential equation of first order of degree n which is represented as follows.

$$\dot{x} = A x + B u \qquad (1)$$

$$y = C x \qquad (2)$$

where x is the state variable of system (vector of degree n), A the system matrix (n×matrix), u the control input (vector of degree m), B the control coefficient (n×m matrix), y the observed value (vector of degree r) and C the observed coefficient (r×n matrix). In this case, $\dot{x}$ represents the time differentiation of the state variable x; x, y and u are varibles, respectively; and A, B and C are constants, respectively.

For the linear control system expressed by the Eqs. (1) and (2), it is possible to form the observer which are expressed by the following equations.

$$\dot{Z} = FZ + Gy + Bu \qquad (3)$$

$$G = A - GC \qquad (4)$$

where Z is the state variable estimate (vector of degree n), F the estimate gain (n x n matrix) and G the input coefficient to the observer (n x r matrix).

In this case, A, B, C, u and y are the same as those in the Eqs. (1) and (2). $\dot{Z}$ represents the time differentiation of the state variable estimate Z; Z a variable; and, F and G are the constants, respectively. In the observer expressed by the Eqs. (3) and (4), if the input coefficient G is selected to be a proper value, the state varible estimate Z can be gradually converged to the value of the state variable x at a desired speed. Since the mathematical properties of the observer are already described in greater detail in books on the control engineering, only the property relating to the present invention will be described hereinbelow.

In accordance with the present invention, a total of 6 signals of the horizontal components $\alpha$ and $\beta$ of acceleration derived from the horizontal component computing section 54, the azimuth deviation signal between the azimuth angle signal AS derived from the CTM computing section 53 and the magnetic azimuth signal MAS which azimuth deviation signal are calculated by the azimuth slaving torque computing section 57 and the bias signals from the X, Y and Z gyros are respectively selected to be state variable x. Then, a total of three signals of the erecting torque signals ET1 and ET2 of the east and west direction and the south and north direction from the erecting torque computing section 56 and the azimuth slaving torque signal AT derived from the azimuth slaving torque computing section 57 are selected to be the observed value y. Finally, three bias correcting signals BC for the X, Y and Z gyros derived from the gyro bias computing section 58 are selected as the control input u, respectively. If the state variable x, the observed value y and the control input u are selected as described above, the constants A, B and C in the Eqs. (1) and (2) indicating the mutual relationship of the respective variables can be defined.

In the observer expressed by the Eqs. (3) and (4), the state variable estimate value Z is the estimate value of the state variable x selected as described above. The variables y and u and the constants A, B and C are the same as those in the Eqs. (1) and (2) and are already determined. Since the constants A and C are already determined, if the constant G is determined, the estimate gain F can be obtained from the Eq. (4). Consequently, if the constant G which is the input coefficient to the observer is determined, the observer expressed by the Eqs. (3) and (4) can be determined uniquely. The constant G is selected in such a manner that the state variable estimate Z is converged to the state variable x with a time which is sufficiently shorter than the time constants (several 10s of seconds to several 100s of seconds) of the erecting system and the azimuth slaving system.

It will be apparent that if the variables and constants are selected as described above and the Eq. (3) is integrated, the estimated values of the biases of the respective X, Y and Z gyros 1, 2 and 3 are obtained as part of the state variable estimate Z. The constants A, B and C in the Eqs. (3) and (4) include the CTM signal CS, and this CTM signal CS is changed as the attitude and heading reference angle of the navigation vehicle is changed, so that the above-mentioned constants A, B and C are not the constants, strictly speaking. The CTM signal CS, however, is computed by the CTM computing section 53 shown in FIG. 8 and is already known so that the constants A, B and C can be computed by the CTM signal CS derived from the CTM computing section 53. Thus, the A, B and C may be treated as the constants.

Figure 9:
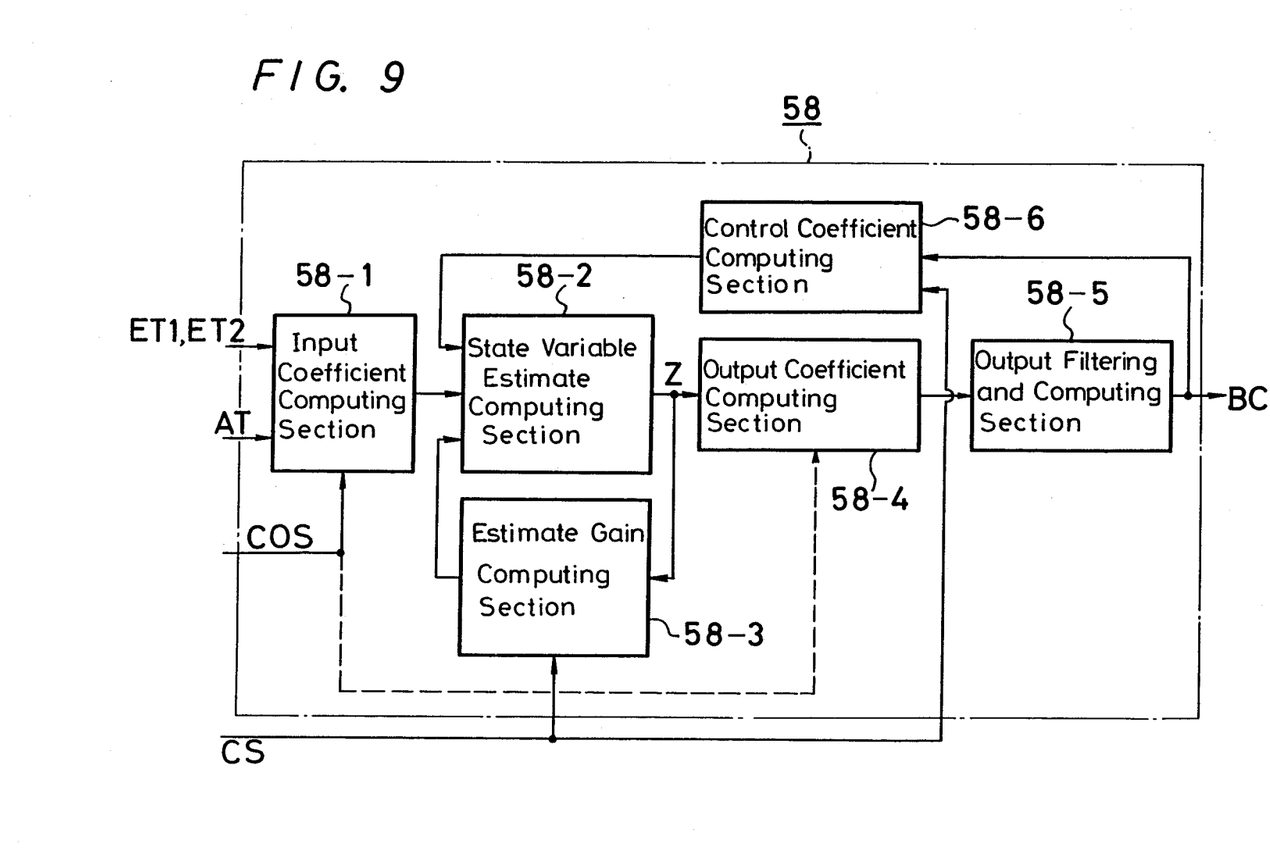
FIG. 9 is a block diagram showing an example of a gyro bias computing section used in the embodiment of the computing section shown in FIG. 8.

FIG. 9 is a block diagram showing an embodiment of the gyro bias computing section 58 in the embodiment shown in FIG. 8 which is constructed by using the observer expressed by the Eqs. (3) and (4).

Referring to FIG. 9, there is shown an input coefficient computing section 58-1. This input coefficient computing section 58-1 multiplies the erecting torque signals ET1 and ET2 from the erecting torque computing section 56 shown in FIG. 8 and the azimuth slaving torque signal AT (observed value y) from the azimuth slaving torque computing section 57 shown in FIG. 8 by the input coefficient G and then supplies the multiplied result to a state variable estimate computing section 58-2. The state variable estimate computing section 58-2 integrates the differential equation expressed by the Eq. (3) by using the output from the input coefficient computing section 58-1, the output from an estimate gain computing section 58-3 and the output from a control coefficient computing section 58-6 and then produces the state variable estimate value Z.

The estimate gain computing section 58-3 computes the estimate gain F expressed in the Eqs. (3) and (4) by using the CTM signal CS derived from the CTM computing section 53 shown in FIG. 8. Also, it multiplies the state variable estimate value Z by the estimate gain F and then feeds the computed result back to the state variable estimate computing section 58-2. An output coefficient computing section 58-4 selects only the estimate values corresponding to the gyro biases of the X, Y and Z gryos 1, 2 and 3 from the state variable estimate value Z derived from the state variable estimate computing section 58-2 and delivers the same. An output filtering and computing section 58-5 filters out the output from the output coefficient computing section 58-4 and supplies its output to the bias correctors 50, 51 and 52 shown in FIG. 8 as the bias correcting signal BC. The bias correcting signal BC derived from the output filtering and computing section 58-5 corresponds to the control input u in the Eq. (3). The control coefficient computing section 58-6 computes the control coefficient G by using the CTM signal CS from the CTM signal computing section 53 shown in FIG. 8. At the same time, it multiplies the bias correcting signal BC by the control coefficient G and then supplies the multiplied result to the state variable estimate computing section 58-2, wherein the influence of transition error caused by correcting the gyro bias is removed, to thereby speed up the convergence of the state variable estimate value Z.

When the observer is applied to the gyro bias computing section 58 of the embodiment shown in FIG. 8, only three of the horizontal components $\alpha$ and $\beta$ of acceleration derived from the horizontal component computing section 54 and the azimuth deviation signal between the azimuth angle signal AS to be computed in the azimuth slaving torque computing section 57 and the magnetic azimuth signal MAS are generally selected as the state variable and the gyro biases of the respective X, Y and Z gyros 1, 2 and 3 are treated as the input of external disturbance. According to the present invention, however, the gyro biases of the X, Y and Z gyros 1, 2 and 3 are treated as the state variable so that it becomes possible to estimate the gyro biases of the X, Y and Z gyros 1, 2 and 3 by using the observer. Further, the control input u in the Eqs. (1) and (2) is generally treated as an input independent of the state variable x and the state variable estimate value Z.

Figure 10:
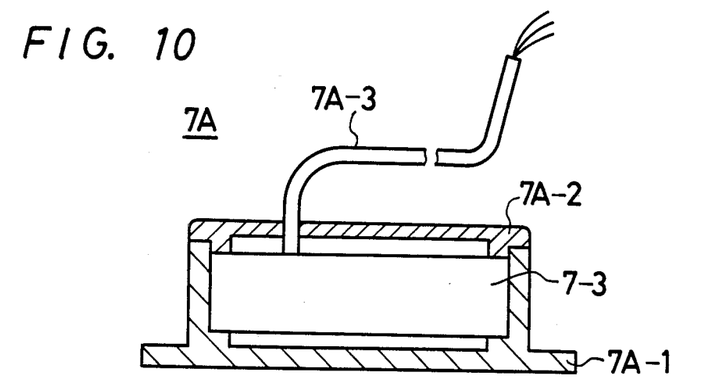
FIG. 10 is a partially cross-sectional view of an embodiment of the magnetic azimuth sensor used in the embodiment of the attitude and heading reference detecting apparatus according to the present invention.

FIG. 10 is a cross-sectional view of a magnetic azimuth sensor 7A of the present invention which is used instead of the magnetic azimuth sensor 7A shown in FIG. 7. Referring to FIG. 10, the embodiment of the magnetic azimuth sensor 7A shown includes a box-shaped portion 7A-1 which houses therein a magnetic azimuth detecting section 7-3 similar to that appeared in FIGS. 5 and 6. There are shown a lid 7A-2 for closing the box-shaped portion 7A-1 and a lead wire 7A-3 by which the magnetic azimuth detecting section 7-3 disposed within the box-shaped portion 7A-1 and the lid 7A-2 is powered. Also, the lead wire 7A-3 is used to derive a magnetic azimuth signal from the magnetic azimuth detecting section 7-3. This magnetic azimuth detecting section 7-3 is directly mounted to the body of the navigation vehicle, in a manner not shown.

According to the magnetic azimuth sensor 7A shown in FIG. 10, since it has no universal joint unlike the prior art, the attitude and heading reference detecting apparatus which use it can be made small, light in weight and can be produced at low cost.

Figure 11:
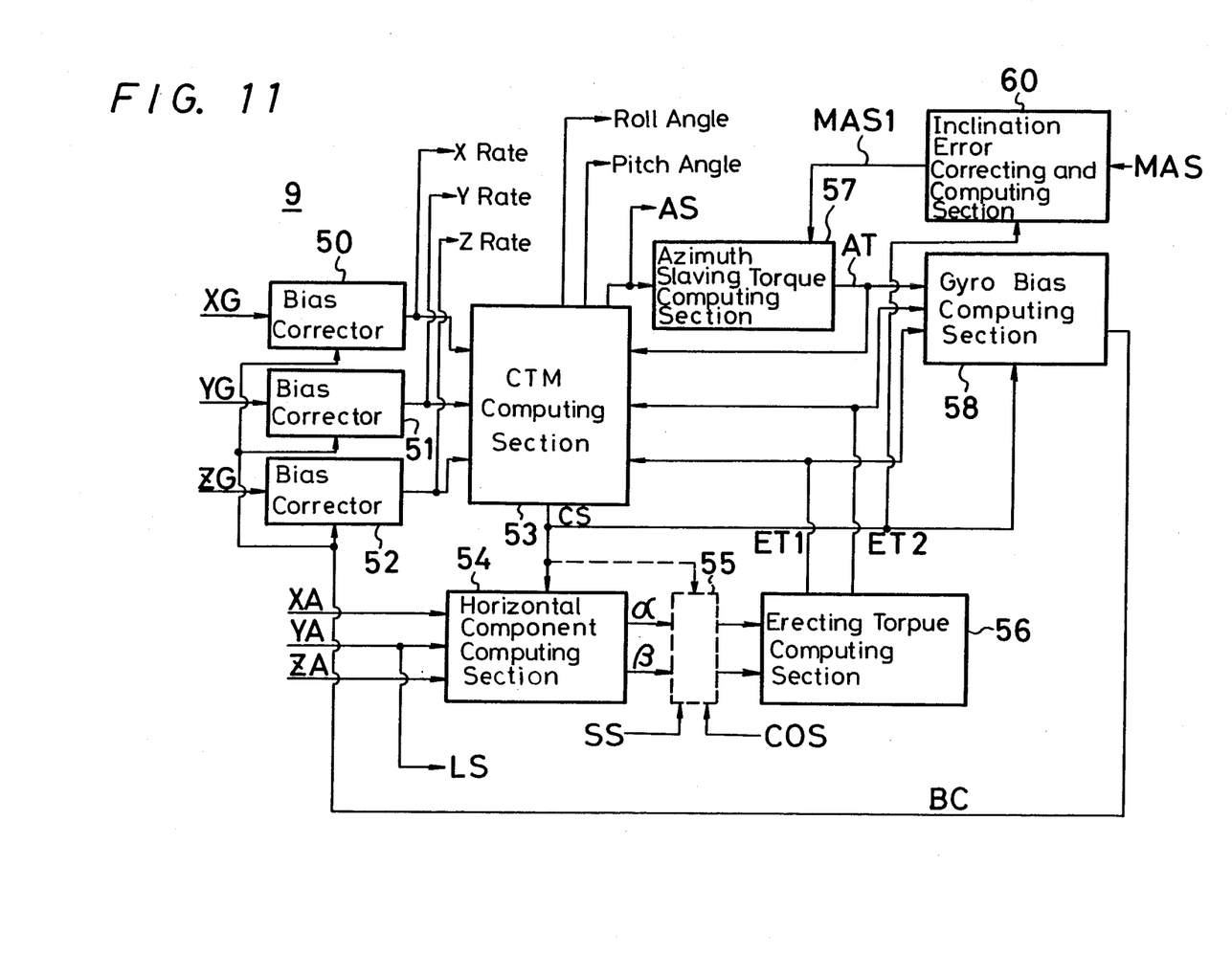
FIG. 11 is a block diagram showing another embodiment of the computing section used in the attitude and heading reference detecting apparatus according to the present invention.

FIG. 11 is a block diagram similar to the block diagram of FIG. 8 and illustrates other embodiment of the attitude and heading reference detecting apparatus according to the present invention. This embodiment shown in FIG. 11 is different from that of FIG. 8 only in that it is provided with an inclination error correcting and computing section 60. In FIG. 11, like parts corresponding to those of FIG. 8 are marked with the same references and therefore need not be described in detail.

Referring to FIG. 11, the azimuth angle signal AS from the CTM computing section 53 and a magnetic azimuth signal MAS1, which is provided by correcting the inclination error of the magnetic azimuth signal MAS from the magnetic azimuth sensor 7A shown in FIG. 10 in the inclination error correcting and computing section 60, are supplied to the azimuth slaving torque computing section 57, in which they are compared with each other to produce a torque signal around the azimuth axis. This torque signal is fed back to the CTM computing section 53 so as to remove the difference therebetween. Other portions in FIG. 11 are substantially the same as those in FIG. 8 and hence, the detailed description thereof will be omitted.

According to the preset invention, as set forth above, since the bias estimate values of the X, Y and Z gyros 1, 2 and 3 obtained as parts of the state variable estimate value Z are fed back as the bias correcting signal BC and also, the bias correcting signal BC is treated as the control input u and fed to the observer itself, the transition error caused by feeding back the bias correcting signal BC included in the input signal y can be removed and the time required by the observer to estimate the gyro bias can be made shorter than the cycle (normally several 10s of seconds) of the erecting loop.

On the other hand, it is proposed to construct the bias computing section without the observer as follows. That is, as shown in, for example, FIG. 8 the output signals ET1 and ET2 from the erecting torque computing section 56 and the output signal AT from the azimuth slaving torque computing section 57 are transformed into gyro coordinates by the CTM (coordinate transform matrix) and then integrated to thereby produce the bias correcting signal BC for each gyro. According to this method, the time constant for the integration must be selected to be sufficiently longer than the time constant of the erecting loop and it takes a lot of time to estimate the gyro bias.

While the gyro bias computing section 58 using the observer of the present invention has an advantage that it provides the bias correcting signal BC with a short time as compared with other methods, it has a disadvantage in that it is easily affected by an external disturbance such as an acceleration. Therefore, when the navigation vehicle moves with acceleration such as during turns, or increases or decreases its speed or the like, the supply of the input to the gyro bias computing section 58 is cut off by the cut-off signal COS in the input coefficient computing section 58-1 to thereby remove the influence of the acceleration of the movement exerted upon the navigation vehicle. If the navigation vehicle navigates at low speed and the acceleration movement of the navigation vehicle is small, instead of cutting off the supply of the input to the gyro bias computing section 58 by the input coefficient computing section 58-1, the output from the output coefficient computing section 58-4 may be cut off by the cut-off signal COS. In regard to the acceleration of external disturbance such as vibration and so on with high frequencies, the influence thereof can be removed by producing the signal which has been filter by the output filtering and computing section 58-5.

In accordance with the embodiment of the present invention, the gyro bias computing section 58 (observer) is constructed as described above, in which case the erecting torque computing section 56 and the azimuth slaving torque computing section 57 shown in FIG. 8 are formed only by the proportional gains. The erecting torque computing section 56 and the azimuth slaving torque computing section 57 may sometimes include the filter. In that case, the above-mentioned circuit arrangement can easily be extended by adding the respective filter outputs to the state variable x in the Eq. (1) and to the state variable estimate value Z in the Eq. (3).

Instead of the outputs ET1 and ET2 from the erecting torque computing section 56 and the output AT from the azimuth slaving torque computing section 57, the output from the acceleration correcting and computing section 55 and the deviation signal between the azimuth angle signal AS and the magnetic azimuth signal MAS computed within the azimuth slaving torque computing section 57 may be selected as the observed value y.

According to the present invention, since the conventional rate gyro, the vertical gyro and the directional gyro are replaced by three gyros and three accelerometers, the complicated elements such as gimbals, transmitters, torques, erecting apparatus and so on used in the conventional apparatus become unnecessary so that the attitude and heading reference detecting apparatus of the present invention can be simplified in construction and produced at low cost.

Since the non-rotational type gyros such as the vibration gyro, the gas rate gyro or the like are employed as the gyro, the parts such as the bearings, the slip rings and so on that require maintenance and inspection become unnecessary, and the attitude and heading reference detecting apparatus of the present invention has a long lifetime and can be substantially made free of maintenance.

Further, since the attitude and heading reference detecting apparatus of the present invention does not require assembly parts such as bearings, synchro transmitters, torquers and so on, the apparatus of the invention can be assembled easily without skill.

Furthermore, according to the present invention, since the gyro bias computing section is provided to correct the gyro bias within the system, the satisfactory system efficiency can be ascertained even if the inexpensive vibration gyro and gas rate gyro are used.

Since the gyro bias estimated by the observer is fed back as the bias correcting signal and is also supplied to the observer itself and the influence of the transition error caused by feeding back the bias correcting signal can be removed, it is possible to reduce the estimating time of the gyro bias.

In addition, when the navigation vehicle has acceleration, the input to the observer or the output from the observer is cut off so that it is possible to remove the influence exerted upon the navigation vehicle by its acceleration movement.

Furthermore, according to the present invention, as set forth above, it is possible to remove the influence of high frequency acceleration such as vibration and so on by the provision of the output filtering and computing section.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. Attitude and heading reference detecting apparatus comprising:
  (a) three gyros and three accelerometers mounted on a navigation vehicle in such a manner that their input axes are respectively made coincident with the principal three axial directions of said navigation vehicle;
  (b) a magnetic azimuth sensor;
  (c) a signal transforming section supplied with outputs from said three gyros, outputs from said three accelerometers and an output from said magnetic azimuth sensor;
  (d) a computing section supplied with an output from said signal transforming section; and
  (e) a signal output section supplied with an output from said computing section for producing an attitude and heading reference signal and for delivering the same to an outside terminal, wherein said computing section comprises a CTM (coordinate transforming matrix) computing section for receiving the gyro signals from said three gyros, a horizontal component computing section for calculating horizontal components of gravity from a CTM signals from said three accelerometers, an erecting torque computing section supplied with an output from said horizontal component computing section and for computing a CTM erecting torque signal, an azimuth slaving torque computing section for comparing an azimuth signal from said CTM computing section and a magnetic azimuth signal from said magnetic azimuth sensor and for computing an azimuth slaving torque signal which causes said CTM to be restricted to said magnetic azimuth signal around said azimuth axis, wherein said erecting torque signal and said azimuth slaving torque signal are fed back to said CTM computing section, and said computing section further includes a gyro bias computing section which is supplied with said erecting torque signs, said azimuth slaving torque signal and said CTM signal for computing a gyro bias, and said three gyro bias correctors are further supplied with an output from said gyro bias computing section and produce rate outputs.

2. Attitude and heading reference detecting apparatus according to claim 1, wherein said gyro bias computing section is an observer.

3. Attitude and heading reference detecting apparatus according to claim 1, wherein said magnetic azimuth sensor has a magnetic azimuth detecting section directly mounted to said navigation vehicle.

4. Attitude and heading reference detecting apparatus according to claim 3, further comprising an inclination error correcting and computing section provided in said computing section for correcting an error caused by the inclination of said magnetic azimuth sensor.

* * * * *